United States Patent [19]

Kobayashi

[11] 4,037,138

[45] July 19, 1977

[54] ZERO-PHASE SEQUENCE PROTECTIVE DEVICE FOR FAULTS WITHIN ARMATURE OF THREE-PHASE SYNCHRONOUS MACHINE

[75] Inventor: Koreyasu Kobayashi, Tagajyo, Japan

[73] Assignee: Koreyasu Kobayashi, Japan

[21] Appl. No.: 618,559

[22] Filed: Oct. 1, 1975

[30] Foreign Application Priority Data

Oct. 3, 1974 Japan .............................. 49-114374

[51] Int. Cl.² .............................................. H02H 7/08
[52] U.S. Cl. .................................. 317/13 R; 361/35; 361/42
[58] Field of Search ................. 317/17, 13 R, 20, 49, 317/50, 53; 307/105, 93, 92, 59, 62

[56] References Cited

U.S. PATENT DOCUMENTS

| | | | |
|---|---|---|---|
| 1,255,387 | 2/1918 | Chubb | 317/53 |
| 2,246,926 | 6/1941 | Roman | 317/49 X |
| 2,296,109 | 9/1942 | Light | 307/93 X |
| 2,535,064 | 12/1950 | Harrison | 317/13 R |
| 2,824,978 | 2/1958 | Knudsen | 317/17 X |
| 3,270,246 | 8/1966 | Lemens | 307/92 X |
| 3,546,572 | 12/1970 | Specht et al. | 307/93 X |
| 3,555,291 | 1/1971 | Dewey | 307/105 |
| 3,617,765 | 11/1971 | Kilgour et al. | 317/20 X |
| 3,688,157 | 8/1972 | Spears | 317/13 R |

*Primary Examiner*—J D Miller
*Assistant Examiner*—Patrick R. Salce
*Attorney, Agent, or Firm*—Burgess, Ryan and Wayne

[57] ABSTRACT

The neutral impedance of a three-phase synchronous machine is so combined with the three-phase, Y-connection protective impedance with the neutral ground connected to a terminal of the synchronous machine that the line current in the branch including a fault may be reduced to zero when a parallel fault occurs within the armature winding, thereby protecting the armature winding and the core of the rotor from burning.

5 Claims, 2 Drawing Figures

ZERO-PHASE SEQUENCE PROTECTIVE DEVICE FOR FAULTS WITHIN ARMATURE OF THREE-PHASE SYNCHRONOUS MACHINE

BACKGROUND OF THE INVENTION

The present invention relates to a zero-phase sequence protective device for protecting from burning the armature winding and the core of the rotor of a three-phase synchronous machine when a line-to-ground fault occurs within the synchronous machine.

According to the prior art protective method for interior faults of three-phase synchronous machines, interrupters are used to isolate the machine with a fault from the system, and concurrently the excitation thereof is interrupted. However this method has a defect that a finite time is required before the machine with a fault or short-circuit is isolated from the system so that the fault current in greater magnitude flows to the fault, resulting in the burning of the fault point. Furthermore, the prior art method has also another serious effect that in case of the occurence of a fault, a large second positive-phase sequence current flows into the armature, resulting in eddy currents in the core of the rotor and consequently the overheating and burning thereof.

SUMMARY OF THE INVENTION

One of the objects of the present invention is therefore to provide a protective device or preventing the burning of a fault point in the armature winding and the burning of the core of the rotor of a three-phase synchronous machine when an interior fault occurs in one phase thereof.

Another object of the present invention is to provide a zero-phase sequence protective device for the faults within the armature of a three-phase synchronous machine, in which a three-phase, neutral-point-grounded Y-connection capacitive protective impedance is connected to the terminal of the synchronous machine to adjust the neutral impedance thereof, thereby causing a zero-phase sequence synchronous machine (zero-phase sequence component) of provide series oscillation at the system frequency.

A further object of the present invention is to provide a zero-phase sequence protective device for the internal fault of the armature of a three-phase synchronous machine, wherein when a line-to-ground fault occurs in one phase of the armature, the second positive-phase (negtaive-phase) sequence current is made zero.

The above and other objects of the present invention may be attained by connecting the terminals of a three-phase synchronous machine to a neutral-point-grounded Y-connection impedance in such a way that said impedance as well as the neutral impedance of said syncrhonous machine may make the line current in the branch including a fault, zero when a parallel fault occurs in the armature.

DESCRIPTION OF THE PREFERRED EMBODIMENT

Figure 1:
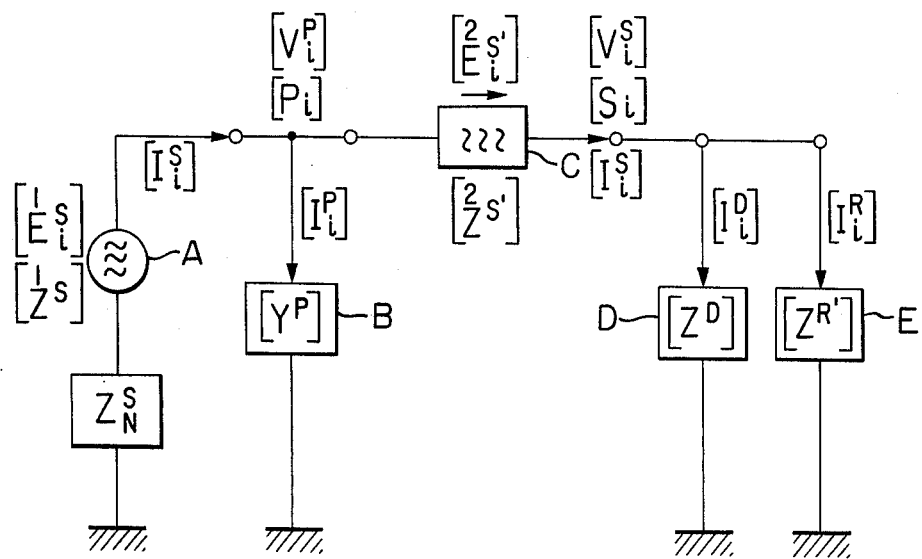
FIG. 1 is a diagram used or the explanation of the underlying principle of the present invention and illustrating the distributions of the voltages and line currents in the system.

Referring first to FIG. 1, the underlying principle of the present invention will be described. It is assumed that the phase $a$ of the armature winding of a three-phase generator has a line-to-ground fault at the point $[Pi]$ so that the current flows through the admittance $[Y^p][\mho \angle]$ to ground. And let $$[\overset{2}{E_i^s}](V\angle)$$

denote the electromotive force from the neutral point $N^s$ to the fault $$[Pi] \cdot [\overset{1}{Z^s}](\Omega \angle),$$

the internal phase impedance;

$$[\overset{2}{E_i^s}](V\angle)$$

$$[\overset{2}{E_i^s}](V\angle)$$

the electromotive force from the fault $[Pi]$ to the output terminal $[Si]$; and $$[\overset{2}{Z^{s'}}](\Omega \angle)$$

the internal phase impedance. It is further assumed that the neutral point $N^s$ is grounded through the grounding impedance $Z_n^s [\Omega]$. In FIG. 1, A denotes a symmetrical three-phase generator; B, branch with the lint-to-ground fault in the phase $a$ and with admittance $[Y_a^p][\mho \angle]$; C, a symmetrical three-phase series generator with the electromotive force $$[\overset{2}{E_i^s}]$$

and internal phase impedance $$[\overset{2}{Z^{B'}}](\Omega \angle)$$

a symmetrical three-phase protective impedance with impedance $[Z^p][\Omega \angle]$ for suppressing the fault current, the impedance D having a Y-connection with the neutral point directly grounded; and E, the overall load (including a load, a sending end transformer, a transmission line and a receiving end transformer, and looking into the terminals of the primary of the transformer on the side of the output) of a system with the impedance $[Z^R][\Omega \angle]$.

With the above assumption, at the output terminal $[Si]$ $$\begin{bmatrix} [V_{a_i}^s] \\ [I_{a_i}^s] \end{bmatrix} = \begin{bmatrix} [Z^R] & [I_{ai}^s] \\ [I_{a_i}^s] & \end{bmatrix} \begin{bmatrix} (V\angle) \\ (A\angle) \end{bmatrix}$$

where $[\overline{Z}^R] = ([\overline{Z}^p]^{-1} + [\overline{Z}^R_1]^{-1})^{-1} -$.

-continued $$[\mathbb{Z}^R]([\mathbb{Z}^R] + [\mathbb{Z}^D])^{-1}[\mathbb{Z}^D] \quad (\Omega \angle)$$
$$[\mathbb{Z}^R]$$

$$[V_{a_1}^s] = [T]^{-1}[V_i^s] = [V_{a0}^s V_{a1}^s V_{a2}^s]_t \quad (V\angle)$$

$$[T] = \begin{bmatrix} 1 & 1 & 1 \\ 1 & \gamma^{-1} & \gamma^{-2} \\ 1 & \gamma^{-2} & \gamma^{-2\cdot 2} \end{bmatrix} \quad \text{(Numeric } \angle\text{)}$$

$$\gamma = \epsilon j \frac{2\pi}{3} = \frac{1}{2} + j\sqrt{\frac{8}{2}} \quad \text{(Numeric } \angle\text{)}$$

$$[I_{a_1}^s] = [T]^{-1}[I_i^s] = [I_{a0}^s I_{a1}^s I_{a2}^s]_t \quad (A\angle)$$

The superscript "s" of the element $V_{a_1}{}^s$ denotes that $V$ represents the potential at the output terminal [Si]; the subscript "$l$" denotes the symmetrical component 0, or 2 in the three-phase; and the subscript "$a$" denotes that the symmetrical component is based upon the phase $a$; that is, the symmetrical component is that of the phase $a$. The same is true for the other symbols.

[T] represents the transformation matrix for transforming the quantities of the three-part into the symmetrical three-phase components;

[$\mathbb{Z}^R$] represents in symmetrical three-phase coordinates the combined load impedance of the protective impedance $D$ and the overall load impedance, and is given by $$[\mathbb{Z}^R] = [T]^{-1}[Z^R][T]$$

$$= [T]^{-1}\begin{bmatrix} Z_{aa}^R & Z_{ab}^R & Z_{ea}^R \\ Z_{ab}^R & Z_{bb}^R & Z_{bc}^R \\ Z_{ea}^R & Z_{bc}^R & Z_{cc}^R \end{bmatrix} X[T] = \begin{bmatrix} Z_{00}^R & Z_{01}^R & Z_{02}^R \\ Z_{10}^R & Z_{11}^R & Z_{12}^R \\ Z_{20}^R & Z_{21}^R & Z_{22}^R \end{bmatrix} \quad (\Omega \angle)$$

where $$[Z_{i0}^R] = [T]^{-1}[Z_{i0}]$$
$$[Z_{i1}^R] = [T]^{-1}[Z_{i1}]$$
$$[Z_{i2}^R] = [T]^{-1}[Z_{i2}] \quad (\Omega \angle)$$

$$[Z_{i0}] = [Z_i^R][1]$$
$$[Z_{i1}] = [Z_i^R][\gamma^{-(i-1)\Delta ij}][l]$$
$$[Z_{i2}] = [Z_i^R][\gamma^{-(i-1)2\Delta ij}][l] \quad (\Omega \angle)$$

$$[Z_i^R] = \begin{bmatrix} Z_{aa}^R & Z_{ab}^R & Z_{ea}^R \\ Z_{bb}^R & Z_{bc}^R & Z_{ab}^R \\ Z_{ee}^R & Z_{ea}^R & Z_{bc}^R \end{bmatrix} \quad (\Omega \angle)$$

$$1] = [1\ 1\ 1]_t \quad \text{(Numeric } \angle\text{)}$$

[$Z_{i0}{}^R$], [$Z_{i1}{}^R$] and [$Z_{i2}{}^R$] represent the zero-phase impedance, the first positive-phase impedance and the second positive-phase (negative-phase) impedance, respectively, of each phase of the combined load when the line current distributions of the combined load are of the zero-phase, the first positive-phase and the second positive-phase, respectively.

[$Z_{i0}^R$] [$Z_{i1}^R$] and [$Z_{i2}^R$]

respresents the symmetrical components of the symmetrical impedances of the combined load based upon the phase $a$. The same is true for the other symbols.

Since both the combined load E and the protective impedance D are given in the form of the symmetrical three-phase equations [$\mathbb{Z}^R$] is a diagonal matrix, and is given by $$[\mathbb{Z}^R] = ([\mathbb{Z}^D]^{-1} + [\mathbb{Z}^R{}_1]^{-1})^{-1} = [\mathbb{Z}^R{}_1]([\mathbb{Z}^R{}_1] + [\mathbb{Z}^D])^{-1} X$$
$$[\mathbb{Z}^D] \quad [\Omega\angle]$$

Between the point on the side of the output terminal of the fault [Pi] and the [Si], the following relation is established:

$$\begin{bmatrix} V_{a_1}^s \\ I_{a_1}^s \end{bmatrix} = \begin{bmatrix} -\overset{2}{E}_{a_1}^s \\ [I_{a_1}^s] \end{bmatrix} + ([V_{a_1}^s] + [\overset{2}{\mathbb{Z}}^s][I_{a_1}^s]) = \begin{bmatrix} -[\overset{2}{E}_{a_1}^s] \\ 0[1] \end{bmatrix}$$

$$+ \begin{bmatrix} [U] & [\overset{2}{\mathbb{Z}}^s] \\ [O] & [U] \end{bmatrix} \begin{bmatrix} [V_{a_1}^s] \\ [I_{a_1}^s] \end{bmatrix} \begin{bmatrix} (V\angle) \\ (A\angle) \end{bmatrix}$$

where $$[U] = [\delta_{ik}]$$

$$[O] = \begin{bmatrix} 0 & 0 & 0 \\ 0 & 0 & 0 \\ 0 & 0 & 0 \end{bmatrix}$$

(Numeric $\angle$)

At the fault [Pi], $$\begin{bmatrix} [V_{a_1}^p] \\ [I_{a_1}^p] \end{bmatrix} = \begin{bmatrix} [U] & [O] \\ [\mathbb{Y}_a^p] & [U] \end{bmatrix} \begin{bmatrix} [V_{a_1}^s] \\ [I_{a_1}^s] \end{bmatrix} \begin{bmatrix} (V\angle) \\ (A\angle) \end{bmatrix}$$

where $[\mathbb{Y}_a^p] = [T]^{-1}[Y_a^p][T]$ $$= [T]^{-1}\begin{bmatrix} Y^p & 0 & 0 \\ 0 & 0 & 0 \\ 0 & 0 & 0 \end{bmatrix}[T]$$

$$= \tfrac{1}{3} Y^p \begin{bmatrix} 1 & 1 & 1 \\ 1 & 1 & 1 \\ 1 & 1 & 1 \end{bmatrix}$$

$(U\angle)$

The branch B with the line-to-ground fault is assumed to have an assymmetrical three-phase Y-connection admittance with its neutral point directly grounded with the phase $a$ including the line-to-ground fault having the self-phase admittance $Y^p$, the phases $b$ and $c$ with no fault having the self-phase admittance zero and with no interaction between the three phases.

At the fault point [Pi] of the three-phase generator A, $$\begin{bmatrix} [V_{a_1}^s] \\ [I_{a_1}^s] \end{bmatrix} = \begin{bmatrix} [\overset{1}{E}_{a_l}^s] - [\overset{1}{\mathbb{Z}}^s][I_{a_l}^s] \\ [I_{a_l}^s] \end{bmatrix} \begin{bmatrix} (V\angle) \\ (A\angle) \end{bmatrix}$$

where $[\overset{1}{\mathbb{Z}}^s] = [T]^{-1}[\overset{1}{Z}^s][T] = [\overset{1}{Z}_i\theta\delta_{ik}] \quad (\Omega \angle)$ $$[\overset{1}{Z}^s] = [\overset{1}{Z}] + \overset{1}{Z}_n^s[31] \quad (\Omega \angle)$$

$$[31] = \begin{bmatrix} 1 & 1 & 1 \\ 1 & 1 & 1 \\ 1 & 1 & 1 \end{bmatrix}$$

(Numeric $\angle$)

It has been assumed that the three-phase generator is a symmetrical three-phase generator in a true sence. (That is, even when the second positive phase sequence current flows through the armature, no third harmonics are included in the potential at the first positive phase sequence terminal. Therefore, $$[\overset{1}{\phantom{.}}] = [\overset{1}{Z}j\Theta \, X\delta_{lk}],$$

and $$[\overset{1}{Z^s}] = \begin{bmatrix} \frac{1}{Z_{aa}} & \frac{1}{Z_{ab}} & \frac{1}{Z_{ca}} \\ \frac{1}{Z_{ab}} & \frac{1}{Z_{bb}} & \frac{1}{Z_{bc}} \\ \frac{1}{Z_{ea}} & \frac{1}{Z_{bc}} & \frac{1}{Z_{cc}} \end{bmatrix} = \begin{bmatrix} \frac{1}{Z}aa^s + Z\eta^s \frac{1}{Z}d\beta + Z\eta^s \frac{1}{Z}F\alpha + Z^s\eta \\ \frac{1}{Z}d\beta + Z^s\eta & \frac{1}{Z}\beta\beta + Z^s\eta & \frac{1}{Z}\beta\Gamma + Z\eta^s \\ \frac{1}{Z}F\alpha + Z\eta^s & \frac{1}{Z}\beta\Gamma + Z\eta^s & \frac{1}{Z}F\Gamma + Z\eta^s \end{bmatrix}$$

$$= \begin{bmatrix} \frac{1}{Z_s} & \frac{1}{Z_m} & \frac{1}{Z_m} \\ \frac{1}{Z_m} & \frac{1}{Z_s} & \frac{1}{Z_m} \\ \frac{1}{Z_m} & \frac{1}{Z_m} & \frac{1}{Z_s} \end{bmatrix}$$

$$[\overset{2}{Z^s}] = \begin{bmatrix} \overset{2}{Z^\epsilon}_{\alpha\alpha} & \overset{2}{Z^\epsilon}_{\alpha\beta} & \overset{2}{Z^\epsilon}_{\gamma\alpha} \\ \overset{2}{Z^\epsilon}_{\alpha\beta} & \overset{2}{Z^\epsilon}_{\beta\beta} & \overset{2}{Z^\epsilon}_{\beta\gamma} \\ \overset{2}{Z^\beta}_{\gamma\alpha} & \overset{2}{Z^\epsilon}_{\beta\gamma} & \overset{2}{Z^\epsilon}_{\gamma\gamma} \end{bmatrix} = \begin{bmatrix} \overset{2}{Z^\epsilon}_{\gamma} & \overset{2}{Z^\epsilon}_{\mu} & \overset{2}{Z^\epsilon}_{\mu} \\ \overset{2}{Z^\epsilon}_{\mu} & \overset{2}{Z^\epsilon}_{\gamma} & \overset{2}{Z^\epsilon}_{\mu} \\ \overset{2}{Z^\beta}_{\mu} & \overset{2}{Z^\epsilon}_{\mu} & \overset{2}{Z^\epsilon}_{\gamma} \end{bmatrix} \quad (\Omega\angle)$$

Let the electromotive force of the generator be denoted by $$[E_j^v](v\angle)$$

then, $$[E_j^v] = [\overset{1}{E_j^v}] + [\overset{2}{E_j^v}]$$

That is, $$[E_{a_t}^v] = [\overset{1}{E_{a_t}^v}] + [\overset{2}{E_{a_t}^v}]$$

where $$[E_{a_t}^v] = E_{a0}^v E_{a1}^v E_{a2}^v] = [0 \, \overset{1}{E_{a1}^v} + \overset{2}{E_{a1}^v} \, 0],$$

$$[\overset{1}{E_{a1}^v}] = [\overset{1}{E_{a0}^v} \overset{1}{E_{a1}^v} \overset{1}{E_{a2}^v}] = [0 \, \overset{1}{E_{a1}^v} \, 0],$$

$$[\overset{2}{E_{a1}^v}] = [\overset{2}{E_{a0}^v} \overset{2}{E_{a1}^v} \overset{2}{E_{a2}^v}] = [0 \, \overset{2}{E_{a1}^v} \, 0], \quad (v\angle)$$

Let $[Z^{s'}]$ denote the overall internal phase impedance of the generator, and $[Z^s][\Omega \angle \,]$, the overall internal impedance looking into the output terminals, then $$[Z^{s'}] = [\overset{1}{Z^{s'}}] = [\overset{2}{Z^{s'}}]$$
$$[Z^s] = [\overset{1}{Z^s}] + [\overset{2}{Z^{s'}}]$$
$$[Z^{\cdot}] = [\overset{1}{Z^{\cdot}}] + [\overset{2}{Z^{s'}}] \quad (\Omega\angle).$$

Therefore, the overall performance is represented by $$\begin{bmatrix} [\overset{1}{E_a^v}] - [\overset{1}{Z^{\cdot}}][I_{ail}^v] \\ [I_{ail}^v] \end{bmatrix} = \begin{bmatrix} [U] & [O] \\ [\overset{R}{g}] & [U] \end{bmatrix} \begin{bmatrix} -[\overset{2}{E_a}]^{s'} \\ [O[1]] \end{bmatrix} + \quad (1)$$

$$\begin{bmatrix} [U] & [Z^{s'}] \\ [O] & [U] \end{bmatrix} X \begin{bmatrix} [\overset{R}{\phantom{.}}] [T_{ail}] \\ [I_{ail}^v] \end{bmatrix} \begin{matrix} (v\angle) \\ (A\angle) \end{matrix}$$

Solving Eq. (1) for the output terminal current $[I_{a_t}^s]$, and then solving for the line current $[I_{a_t}^P]$ in the branch B including the line-to-ground fault, we have $$\begin{bmatrix} I_{a0}^P \\ I_{a1}^P \\ I_{a2}^P \end{bmatrix} = \frac{1}{\Delta} \left[ \frac{1}{3} Y^p (\overset{1}{Z_{00}^s} + \overset{2}{Z_{10}^s})(\overset{1}{Z_{00}^s} + \overset{2}{Z_{10}^s})(\overset{1}{Z_{00}^s} + \overset{2}{Z_{00}^s})E_{a1}^v \begin{bmatrix} 1 \\ 1 \\ 1 \end{bmatrix} \right.$$

$$\left. - \frac{1}{3} Y^p (\overset{1}{Z_{00}^s} + \overset{2}{Z_{00}^s})(\overset{1}{Z_{00}^s} + \overset{2}{Z_{10}^s})(\overset{1}{Z_{00}^s} + \overset{2}{Z_{20}^s})\overset{2}{E_{a1}^v} \begin{bmatrix} 1 \\ 1 \\ 1 \end{bmatrix} \right] \quad (A\angle)$$

where $$\Delta = \frac{1}{3} Y^p \overset{1}{Z_{00}^s} (\overset{1}{Z_{00}^s} + \overset{2}{Z_{00}^s})(\overset{1}{Z_{10}^s} + \overset{2}{Z_{10}^s})(\overset{1}{Z_{00}^s} + \overset{2}{Z_{20}^s}) \quad (\Omega^3\angle) \, (2)$$

$$+ \overset{1}{Z_{10}^s}(\overset{1}{Z_{00}^s} + \overset{2}{Z_{10}^s})(\overset{1}{Z_{00}^s} + \overset{2}{Z_{20}^s})(\overset{1}{Z_{00}^s} + \overset{2}{Z_{00}^s})$$

$$+ \overset{1}{Z_{20}^s}(\overset{1}{Z_{00}^s} + \overset{2}{Z_{10}^s})(\overset{1}{Z_{00}^s} + \overset{2}{Z_{00}^s})(\overset{1}{Z_{00}^s} + \overset{2}{Z_{10}^s})$$

$$+ (\overset{1}{Z_{00}^s} + \overset{2}{Z_{00}^s})(\overset{1}{Z_{00}^s} + \overset{2}{Z_{10}^s})(\overset{1}{Z_{00}^s} + \overset{2}{Z_{20}^s})$$

If $$Z_{00}^s + \overset{2}{Z_{00}^s} = 0 \quad (\Omega\angle) \, (3)$$

then, $$[I_{a0}^P I_{a1}^P I_{a2}^P] = [0 \, 0 \, 0] \quad (A\angle) \, (4)$$

and $$[I_a^P I_b^P I_c^P] = [0 \, 0 \, 0] \quad (A\angle)$$

It shows that the current $[I_1^P]$ in the branch B including the line-to-ground fault becomes zero, and it is also apparent that the line-to-ground fault currents in the phases $b$ and $c$ are zero.

Therefore, it follows that when Eq. (3) is satisfied the burning of the fault point may be prevented even when a line-to-ground fault occurs in one phase of the armature winding. In this specification, Eq. (3) is referred to as "the zero-phase sequence protective condition". Eq. (3) is rewritten in the form of $$Z_{00}{}^R = - Z_{00}{}^s (\Omega\angle)$$

This means that in the system where the zero-phase sequence protective condition is satisfied, the zero-phase sequence system has the series oscillation with respect to the system frequency. In other words, the zero-phase sequence system has the parallel oscillation at the system frequency with respect to the zero-phase sequence branch including the line-to-ground fault. The zero-phase sequence load $Z_{00}{}^R$ is a function of the overall zero-phase sequence load $Z_{00}{}^{R'}$, and varies as the load varies. Since $Z_{00}{}^{R'}$ includes the effective resistance, the overall zero-phase sequence load must be electrically disconnected from the system in order to always satisfy the zero-phase sequence protective condition. This can be simply done by the delta connection of the primary windings of the sending end transformer of the Y-connection with the neutral point ungrounded. Then $$Z_{00}{}^R = Z_{00}{}^{DD} \quad (5)$$

Since the zero-phase sequence internal impedance $Z_{00}{}^S$ of the generator consists of the series connection of the zero-phase sequence internal phase impedance $Z_{00}{}^{S'}$ and $3 Z_n{}^s$, that is, three times the neutral impedance, the impedance $Z_{00}{}^s$ is, in general, inductive. Therefore, in order to satisfy the zero-phase sequence protective condition, $Z_{00}{}^D$ must be capacitive. A symmetrical three phase capacitance, with a neutral-point-grounded Y-connection, capable of carrying the charging current equal in magnitude to the exciting current of the transformer on the side of the transmission line, is used as the zero-phase sequence protective impedance and the neutral impedance $Z_n{}^s$ is adjusted with $Z_{00}{}^D$ so as to satisfy the zero-phase sequence protective condition. Thus adjusted $Z_{00}{}^R = Z_{00}{}^D$ is in general very high.

The zero-phase sequence protective condition may be held regardless of the position of the fault point [$Pi$]. Therefore, regardless of the fault point in the armature winding, the zero-phase sequence protective condition may be satisfied, whereby the protection of the armature winding may be effected. It should be also noted that the zero-phase sequence condition may be held regardless of the line-to-ground fault admittance $Y^P$.

If the zero-phase sequence protective condition is satisfied, the following relation is held at the output [$Si$] of the generator.

$$\begin{bmatrix} I^s_{a0} \\ I^s_{a1} \\ I^s_{a2} \end{bmatrix} = (\delta_{10})^{-1} (E^{s'}_{a1} \begin{bmatrix} -(Z^s_{00} + \overset{2}{Z}{}^s_{10})(Z^s_{00} + \overset{2}{Z}{}^{s'}_{00})^{-1} \\ 1 \\ 0 \end{bmatrix}$$

$$+ \overset{2}{E}{}^{s'}_{a1} \begin{bmatrix} (Z^s_{00} + Z^s_{10})(Z^s_{00} + \overset{2}{Z}{}^{s'}_{00})^{-1} \\ 0 \\ 0 \end{bmatrix})$$

$(A \angle)$ where $$\delta = Z^s_{00} + Z^s_{10} \qquad (6)$$

And, $(V \angle)\ (7)$ $$\begin{bmatrix} V^s_{a0} \\ V^s_{a1} \\ V^s_{a2} \end{bmatrix} = (\delta_{10})^{-1} (E^{s'}_{a1} \begin{bmatrix} -Z^s_{00}(Z^s_{00} + \overset{2}{Z}{}^s_{10})(Z^s_{00} + \overset{2}{Z}{}^{s'}_{00})^{-1} \\ Z^s_{10} \\ 0 \end{bmatrix}$$

$$+ \overset{2}{E}{}^{s'}_{a1} \begin{bmatrix} Z^s_{00}(Z^s_{10} + Z^s_{10})(Z^s_{00} + \overset{2}{Z}{}^{s'}_{00})^{-1} \\ 0 \\ 0 \end{bmatrix})$$

Eqs. (6) and (7) show that the first positive phase sequence, generator holds the normal conditions regardless of the fault so that it gives no surge to the load even when the fault occurs. The second positive-phase (negative-phase) generator does not operate and holds the normal conditions regardless of the fault.

The operation of the zero-phase sequence generator depends upon the fault, and the zero-phase sequence line current $I_{a0}{}^s$ is very small. The magnitude of the zero-phase sequence voltage $V_{a0}{}^s$ is very close to the first positive-phase sequence voltage $V_{a1}{}^s$ so that the voltage $V_a{}^s$ of the phase $a$ including the line-to-ground fault is very close to zero and is lower than the normal magnitude. The voltages $V_b{}^s$ and $V_c{}^s$ of the normal or fault-free phases $b$ and $c$ increase to $\sqrt{3}$ times as much as the normal magnitudes, and $V_b{}^s$ leads the normal voltage by $\pi/6$ radians while $V_c{}^s$ lags the normal voltage by $\pi/6$ radians.

From Eq. (6), the second positive-phase sequence current $I_{a2}{}^s$ is zero so that the magnetic flux due to $I_{a2}{}^s$ is also zero. As a result, no eddy current flows through the rotor core so that the overheating thereof will never occur.

The operation of the generator is independent of the line-to-ground fault admittance $Y^P$.

In the system including the synchronous machine which is compensated with the zero-phase sequence protective device, the transmission line may be compensated by the arc suppressing device independently of the synchronous machine.

Figure 2:
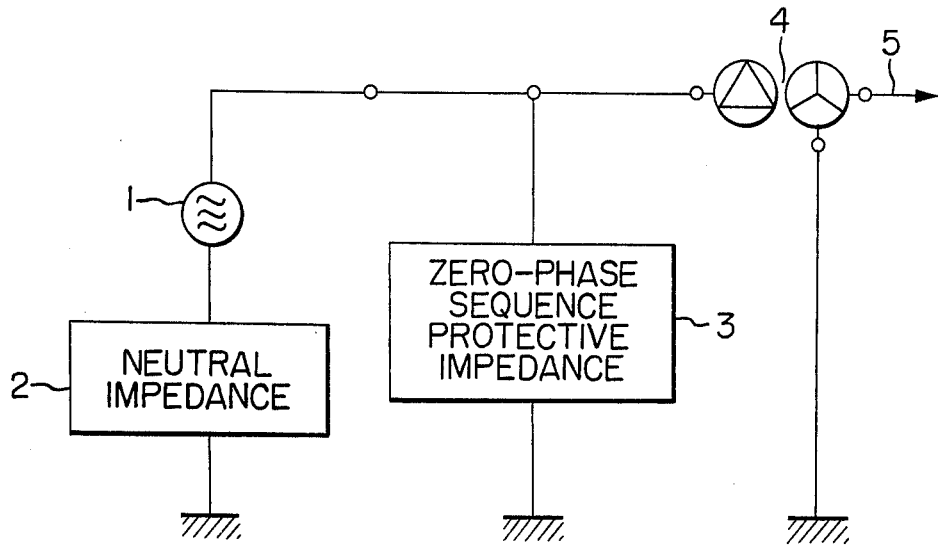
FIG. 2 is a simplified diagram of the circuit of a synchronous machine compensated by the zero-phase sequence protective device in accordance with the present invention.

FIG. 2 is a simplified diagram of a synchronous machine compensated by the zero-phase sequence protective device in accordance with the present invention. Reference numberal 1 denotes a synchronous machine compensated or protected by the zero-phase sequence protective device in accordance with the present invention; 2, the neutral impedance; 3, the zero-phase sequence protective impedance; 4, a transformer; and 5, a transmission line.

The neutral impendance 2 controls the series oscillation of the zero-phase sequence system, and the winding on the side of the synchronous machine of the transformer 4 has a delta connection or Y-connection with underground point. The synchronous machine may be a motor, generator or rotary phase modifier.

What is claimed is:

1. In a three-phase electrical power system, a three-phase synchronous machine having three Y-connected armature windings interconnected at a common point, and a neutral impedance coupling said common point to a neutral point, said windings being connected to corresponding phases of said system; and three protective impedance elements, each element being connected between said neutral point and a corresponding phase of said system, each of said impedance elements having a value such that for each particular phase of said system the values of (i) the zero-phase symmetrical component sequence impedance of the particular armature winding associated with said particular phase, (ii) said neutral impedance, and (iii) the impedance of the protective impedance element connected to said particular phase, combine to provide a series resonant circuit and to exhibit parallel resonance to any fault from said particular armature winding to said neutral point.

2. A zero-phase sequence protective device as set forth in claim 1 wherein each of said protective impedance element is capacitive.

3. A zero-phase sequence protective device as set forth in claim 1 wherein said three-phase synchronous machine is a three-phase rotary phase modifier.

4. A zero-phase sequence protective device as set forth in claim 1 wherein said three-phase synchronous machine is a three-phase synchronous motor.

5. A zero-phase sequence protective device as set forth in claim 1 wherein said three-phase synchronous machine is a three-phase synchronous generator.

* * * * *

UNITED STATES PATENT OFFICE
CERTIFICATE OF CORRECTION

Patent No. 4,037,138                   Dated  July 19, 1977

Inventor(s)  Koreyasu Kobayashi

It is certified that error appears in the above-identified patent and that said Letters Patent are hereby corrected as shown below:

Column 1, line 30:   "or" should be --for--.

line 43:   "of" should be --to--.

line 50:   "negtaive" should be --negative--.

line 56:   "syncrhonous" should be --synchronous--.

line 61:   "or" should be --for--.

Column 2, line 39:   After "B," insert --a--; "lint" should be --line--.

line 45, the formula:   After "]" insert -- ($V\ell$) --.

Column 3, line 21:   "thephase" should be --the phase--.

line 25:   "part" should be --phase--.

UNITED STATES PATENT OFFICE
CERTIFICATE OF CORRECTION

Patent No. 4,037,138      Dated  July 19, 1977

Inventor(s)  Koreyasu Kobayashi

It is certified that error appears in the above-identified patent and that said Letters Patent are hereby corrected as shown below:

Column 5, line 2:   "sence" should be --sense--.

line 9:   "$[^1]$" should be -- $[\not{z}]$ --.

line 63:   " $-[\overset{2}{E}_a{}^{s'}$ " should be --  $-[\overset{2}{E}_{a1}^{s'}]$ --.

line 64:   " $[{}^{\rho}_a]$" should be -- $[\psi^{\rho}_a]$ --.

line 66:   " $[{}^R]$" should be -- $[\not{z}^R]$ --; "T" should be --I--.

Column 6, line 55:   "$Z_{oo}{}^R$" should be -- $Z^R_{oo}$ --.

lines 56 & 57:   "$Z_{oo}{}^{R'}$" should be -- $Z^{R'}_{oo}$ --.

line 65:   "$Z_{oo}{}^R = Z_{oo}{}^{DD}$" should be -- $Z^R_{oo} = Z^D_{oo}$ --.

UNITED STATES PATENT OFFICE
CERTIFICATE OF CORRECTION

Patent No. 4,037,138                    Dated  July 19, 1977

Inventor(s)  Koreyasu Kobayashi

It is certified that error appears in the above-identified patent and that said Letters Patent are hereby corrected as shown below:

Column 6, line 66: "$Z_{oo}{}^S$" should be -- $Z_{oo}^S$ --.

Column 7, line 1: "$Z_{oo}{}^{S'}$" should be -- $Z_{oo}^{S'}$ --.

line 3: "$Z_{oo}{}^S$" should be -- $Z_{oo}^S$ --.

line 5: "$Z_{oo}{}^D$" should be -- $Z_{oo}^D$ --.

line 11: "$Z_{oo}{}^D$" should be -- $Z_{oo}^D$ --.

line 13: "$Z_{oo}{}^R$" should be -- $Z_{oo}^R$ --; "$Z_{oo}{}^D$" should be --$Z_{oo}^D$ --.

line 59: "$I_{ao}{}^S$" should be -- $I_{ao}^S$ --.

line 60: "$V_{ao}{}^S$" should be -- $V_{ao}^S$ --.

UNITED STATES PATENT OFFICE
CERTIFICATE OF CORRECTION

Patent No. 4,037,138           Dated July 19, 1977

Inventor(s) Koreyasu Kobayashi

It is certified that error appears in the above-identified patent and that said Letters Patent are hereby corrected as shown below:

Column 7, line 61: "$V_{a1}{}^s$" should be -- $V_{a_1}^s$ --.

line 62: "$V_a{}^s$" should be -- $V_a^s$ --.

last line: "$V_b{}^s$" should be -- $V_b^s$ --; "$V_c{}^s$" should be -- $V_c^s$ --.

Column 8, line 2: "$V_b{}^s$" should be -- $V_b^s$ --.

line 3: "$V_c{}^s$" should be -- $V_c^s$ --.

line 6: "$I_{a2}{}^s$" should be -- $I_{a_2}^s$ -- (both occurrences).

line 26: "impendance" should be --impedance--.

UNITED STATES PATENT OFFICE
CERTIFICATE OF CORRECTION

Patent No. 4,037,138  Dated July 19, 1977

Inventor(s) Koreyasu Kobayashi

It is certified that error appears in the above-identified patent and that said Letters Patent are hereby corrected as shown below:

Column 8, line 53 (claim 2, line 3): "element" should be --elements--.

Signed and Sealed this

Thirtieth Day of May 1978

[SEAL]

Attest:

RUTH C. MASON  
Attesting Officer

LUTRELLE F. PARKER  
Acting Commissioner of Patents and Trademarks